United States Patent [19]
Lundgren

[11] Patent Number: 5,991,099
[45] Date of Patent: Nov. 23, 1999

[54] ADJUSTABLE CHROMATIC CORRECTION LENS

[75] Inventor: Mark A. Lundgren, Corona, Calif.

[73] Assignee: The United States of America as represented by the Secretary of the Air Force, Washington, D.C.

[21] Appl. No.: 09/027,680

[22] Filed: Feb. 23, 1998

[51] Int. Cl.[6] .............................. G02B 9/00; G02B 3/00; G02B 13/04

[52] U.S. Cl. ........................ 359/754; 359/642; 359/750

[58] Field of Search ........................... 359/642, 750–754

[56] References Cited

U.S. PATENT DOCUMENTS

| | | | |
|---|---|---|---|
| 3,924,934 | 12/1975 | Grey | 350/184 |
| 5,103,342 | 4/1992 | Kataoka | 359/674 |

Primary Examiner—Georgia Epps
Assistant Examiner—Suzanne Letendre
Attorney, Agent, or Firm—Robert L. Nathans

[57] ABSTRACT

An imaging lens device at f/4 has zoomlike variable chromatic and spherochromatic correction for imagery in each of the astronomical U, B, V, and R bands. This lens system can thus take advantage of the full usable wavelength range of CCD cameras extending from 0.35–0.9 micrometers. A first triplet lens group effects the chromatic correction by altering separation between lens elements of the triplet while a second triplet lens group maintains a sharp image focus.

9 Claims, 3 Drawing Sheets

| ELEMENT | GLASS | RADIUS (mm) | THICKNESS (mm) | SEPARATION (mm) |
|---|---|---|---|---|
| I | PK50 | R1= -26.12018 | T1=8 | |
| | | R2= -14.81672 | | |
| II | SF10 | | T2=6 | |
| | | R3= -18.27926 | | S1(U)=5.496<br>S1(B)=5.636<br>S1(V)=5.726<br>S1(R)=5.745 |
| III | PSK53A | R4=-12.47618 | T3=8 | |
| | | R5=-17.12861 | | S2=10.279 |
| STOP | | | | |
| | | | | S3=12.334 |
| IV | PK50 | R6=23.75919 | T4=6 | |
| | | R7=41.02367 | | |
| V | SF2 | | T5=4 | |
| | | R8=15.50114 | | S4=1.975 |
| VI | FK51 | R9=17.40879 | T6=6 | |
| | | R10=-62.48372 | | S5 (U)=31.210<br>S5 (B)=31.215<br>S5 (V)=31.318<br>S5 (R)=31.415 |
| IMAGE PLANE | | | | |

FIG. 2

| ELEMENT | GLASS (SCHOTT) | RADIUS (mm) | THICKNESS (mm) | SEPARATION (mm) |
|---|---|---|---|---|
| I | PK50 | R1= -20.19439 | T1=6 | |
| | | R2= -17.37318 | | |
| II | LLF6 | | T2=6 | |
| | | R3= -19.29861 | | S1(U)=8.500<br>S1(B)=9.000<br>S1(V)=9.500<br>S1(R)=10.500 |
| III | BK10 | R4=-11.57324 | T3=6 | |
| | | R5=-14.30377 | | S2=1.001 |
| STOP | | | | |
| | | | | S3 (U)=0.960<br>S3 (U)=3.921<br>S3 (U)=7.229<br>S3 (U)=13.234 |
| IV | PK50 | R6=32.32004 | T4=6 | |
| | | R7=53.02986 | | |
| V | LF5 | | T5=4 | |
| | | R8=15.95816 | | S4=1.231 |
| VI | FK51 | R9=17.04333 | T6=6 | |
| | | R10=-115.6816 | | S5=50 |
| IMAGE PLANE | | | | |

FIG. 4

ADJUSTABLE CHROMATIC CORRECTION LENS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of adjustable imaging lenses.

It is desired to provide a single multi-element lens device which can readily correct its own chromatic aberration over any of the astronomical U, B, V, and R wavelength bands. Such a lens is intended to be used with a set of astronomical filters, and is adjustable in a manner similar to a zoom lens. However, the motion of the lens elements changes the center wavelength at which the imagery is well-corrected rather than the size of the image. This correction is accomplished by a change in spacing between the second and third element of the lens. The spacing is changed as the optical bandpass filters are exchanged for one another.

A camera with a charge coupled device or CCD was to be used in a large telescope and it was desired to use the full wavelength range of the CCD, nominally 0.4 to 0.9 micrometers. A reflective system, insensitive to wavelength, was not practical due to space limitations, and no existing refractive lens system could cover the wavelength range with good imagery. Because the CCD camera was used in astronomical imaging, a U, B, V, or R filter would be used to limit the bandpass of the light into the system. Thus, an appropriate lens only had to correct chromatic aberration well, over a set of limited bands, rather than the entire useful bandpass of the CCD.

In the course of performing the optical design of a system, it is usual to vary the spacing between two lens elements of the lens system to achieve the best chromatic performance over a fixed wavelength bandpass. The best spacing is then fixed. A distinguishing feature of the lens device of the present invention is that the spacing of two lens elements is mechanically varied to accommodate different wavelength bandpasses.

BRIEF SUMMARY OF EMBODIMENTS OF THE INVENTION

The goal of varying the aforesaid chromatic correction is achieved by a first triple lens group. The first two elements of the triple lens group are cemented forming a cemented doublet. The spacing between the second and third triple lens group elements which have different Abbe constants, is changed mechanically by a predetermined distance, changing the center wavelength at which the triple lens group is well corrected. Optionally, the image quality of the system is enhanced by a second triple lens group which converges the light from the first triple lens group into the final focal ratio. Focus at the CCD focal plane is maintained by mechanically shifting the entire lens system relative to the focal plane in accordance with the first species A, or the first triple lens group relative to the second triple lens group in accordance with a second species B by a predetermined distance. The result is the correction of chromatic aberration, transverse and spherochromatic for a selected bandwidth of light.

BRIEF DESCRIPTION OF THE DRAWINGS

FIG. 2 illustrates a table describing the various parameters of the lens device of FIG. 1.

FIG. 4 illustrates a table describing the various parameters of the preferred lens device of FIG. 3.

DETAILED DESCRIPTION OF EMBODIMENTS OF THE INVENTION

Figure 1:
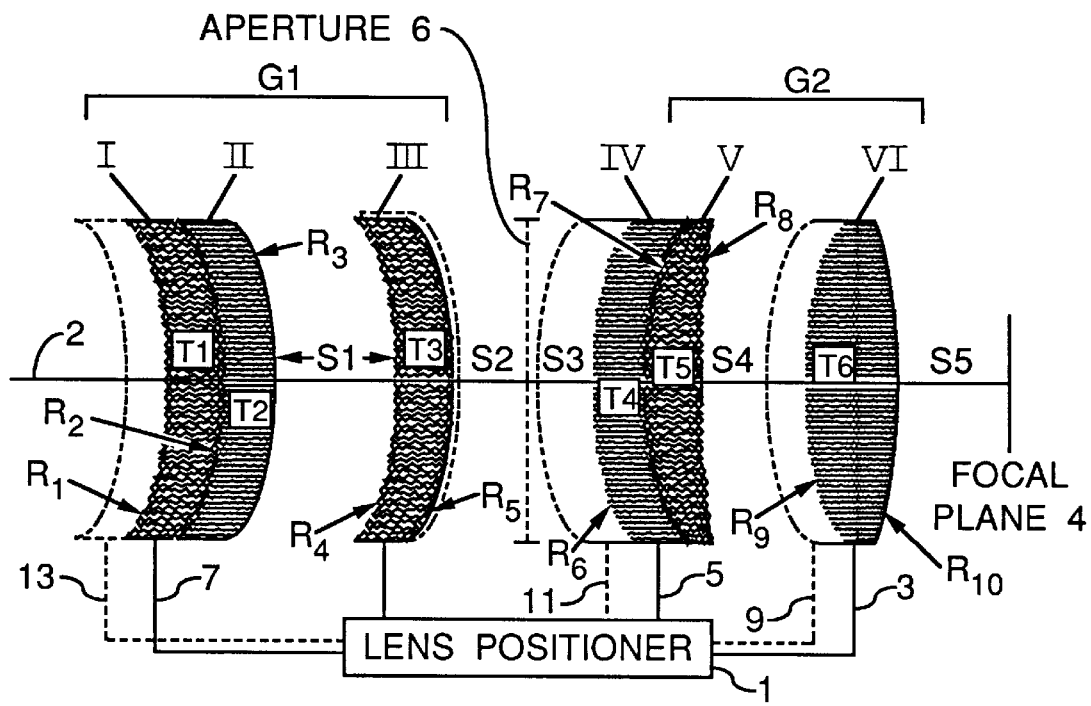
FIG. 1 illustrates an embodiment of the lens device of the invention particularly suitable for certain astronomical applications.

The lens device of the present invention is designed like a double-gauss camera lens. The separation distance S1 between lens elements II and III shown in FIG. 1 can be varied by employing a lens positioning device 1 to move elements I, II, IV, V, and VI together, and away from the focal plane 4, while element III could be moved in the opposite direction slightly toward the focal plane and aperture 6. Changing the distance S1 between elements II and III of the first triple lens group changes the center wavelength at which the triple lens group is well corrected. Manual displacement could be employed if desired. A resulting change in spacing S5 of the last element VI, relative to the focal plane 4, compensates for the focus error that would be introduced by just moving element II and III apart. Lens element III is positioned between lens element II and focusing lens group G2 as shown. FIG. 1 shows a drawing of the lens groups and mechanical links 3, 5, and 7 in one extreme position, with the other extreme position of the lens groups being illustrated by the lens elements and links 9, 11, and 13 outlined in dotted lines. The nature of the lens positioning device 1 forms no part of the invention and its design is well within the skill of the worker in the art. The various parameters of the designed device, including lens prescriptions and dimensions of the lens elements in millimeters, are given in FIG. 2. The design glass numbers are glasses from the current Schott Optical Glass Catalog. Schott is a major optical glass supplier and its glasses are well known in the optics community.

In order to get good image quality over the fourteen degree field of view of the designed system, it was desirable to add the second triple lens group, group G2 including lens elements IV, V, and VI. Group G2 could incorporate a more complex lens system if desired. The preferred embodiment of the invention uses the first triple lens group group G1 and intermediate lens III to perform the chromatic correction with the marginal rays exiting the triple lens group at very shallow angles as they would in a lens with a large focal ratio. The second triple lens group G2 converges the light into the desired focal ratio to maintain focus at the focal plane.

In this first species A of the invention of FIG. 1, after the distance S1 is changed to effect chromatic correction, all six elements, including element III, move with respect to the focal plane. In the preferred second species B of the invention shown in FIGS. 3 and 4, the spacing of elements II and III is varied as before, to control the chromatic aberration. However the first triple lens group G1 thereafter moves relative to the second group G2 comprising elements IV, V, and VI, which is fixed with respect to the focal plane. This changes S3 as indicated in the table of FIG. 4. Only three elements are moving, instead of all six, and the motions are larger and easier to control than in species A. The separations of elements II and III are evenly-spaced, increasing ease of implementation.

It is important to note that in both species A and B, the change in the spacing or distance S1 between lens elements II and III has the effect of allowing the system's spherochromatic and chromatic aberrations to cancel over all four bands, and does not just use focus to achieve optimal image quality.

Figure 3:
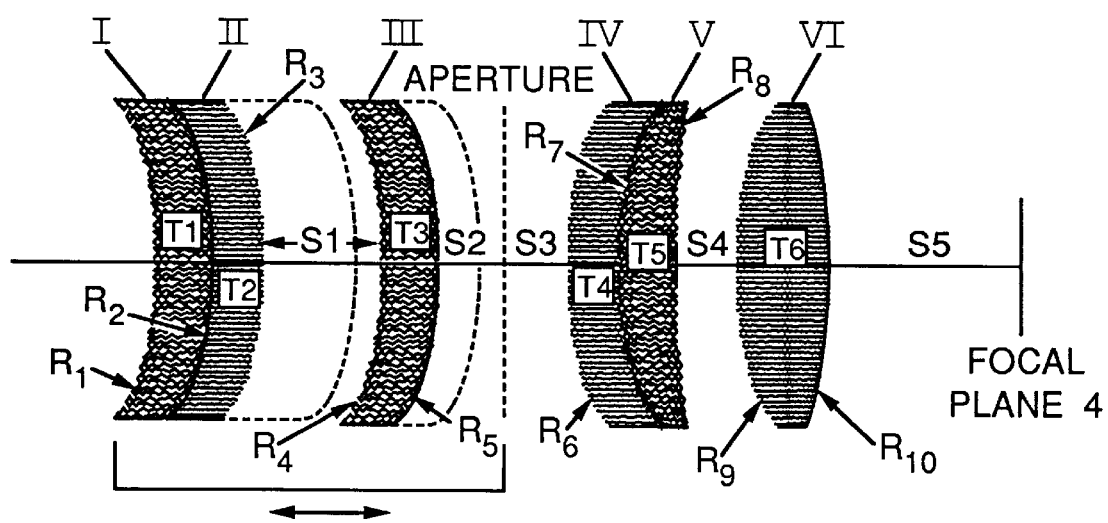
FIG. 3 illustrates a second presently preferred embodiment of the lens device of the invention particularly suitable for certain astronomical applications.

The lens device shown in species A of FIG. 1 has a focal ratio of four, the device shown in FIG. 3 has a focal ratio of 5, and a fourteen degree full field of view. However, the device of the invention can be scaled to various focal lengths, apertures, and focal ratios. Different glasses could be selected to cover different wavelength passbands than the astronomical bands, as will be apparent to skilled workers in the art.

Further details of the invention are disclosed in "Applied Optics", vol. 36, no. 7, dated Mar. 1, 1997, and incorporated by reference herein. For example, further descriptions and diagrams are provided relating to chromatic compensation and focus only compensation for four optical bands, and spot diagrams for the compensating lens in three optical bands are also provided.

Thus, the invention comprises a method of correcting chromatic aberration over a plurality of wavelength bands within an optical system by providing a triple lens group within a larger optical system such as a telescope for example, for performing chromatic correction of light passing therethrough, and having a first and second lens movable together as a unit with respect to a third lens included within the triplet lens group, the second lens being separated from the third lens by a given distance, such distance being adjusted for performing chromatic correction of a plurality of bandwidths of light passing through the optical system.

While two embodiments have been disclosed in detail, variations on the foregoing will be readily apparent to workers in the art and thus the scope of the invention is to be restricted solely by the terms of the following claims and art recognized equivalents thereto. For example, the lens positioning means need not be a mechanical translator or stepping device, but could merely be a rail or the like for slidably supporting the lenses to enable manual repositioning if desired. It may also be feasible to combine the first and second lens elements into an equivalent single lens means; likewise with respect to elements IV and V. Since the critical motion to make the chromatic correction is the change in separation between elements II and III of the first triple lens group, the first triple lens group may be employed even without the second triple lens group which, although providing better image quality, is not essential to the production of chromatic aberration correction.

I claim:

1. An adjustable optical lens system for correcting chromatic aberration over a plurality of wavelength bands comprising, in order from the object side:
   (a) a triple lens group for performing chromatic correction of light passing therethrough and having a first and second lens movable together as a unit with respect to a third lens included within said first triplet lens group, said second lens being separated from said third lens by a distance S1;
   (b) a focus lens means for maintaining focus of image light exiting said triplet lens group at a focal plane; and
   (c) means for performing chromatic correction of a plurality of bandwidths of light by adjusting the distance S1.

2. The lens system of claim 1 including means for moving said first triple lens group with respect to said focusing lens means for maintaining focus at the focal plane.

3. The lens system of claim 2 wherein lenses of the focusing lens means have the parameters substantially as set forth in the table of FIG. 4.

4. The lens system of claim 1 wherein said focusing lens means comprises a second triple lens group.

5. The lens system of claim 4 wherein lenses of the focusing lens means have the parameters substantially as set forth in the table of FIG. 4.

6. The lens system of claim 1 wherein lenses of said triple lens group have the parameters substantially as set forth in the table of FIG. 2.

7. A method of correcting chromatic aberration over a plurality of wavelength bands within an optical system comprising:
   (a) providing a triple lens group within said optical system for performing chromatic correction of light passing therethrough and having a first and second lens movable together as a unit with respect to a third lens included within said triplet lens group, said second lens being separated from said third lens by a given distance; and
   (b) adjusting said given distance for performing chromatic correction of a plurality of bandwidths of light passing through said optical system.

8. The method of claim 7 wherein lenses of said triple lens group have parameters substantially as set forth in the table of FIG. 2.

9. The method of claim 7 wherein lenses of said triple lens group have parameters substantially as set forth in the table of FIG. 4.

* * * * *